United States Patent [19]

Sevelin

[11] 4,268,117
[45] May 19, 1981

[54] SHEET ASSEMBLY FOR FORMING IMAGED RETROREFLECTIVE SHEETING

[75] Inventor: Charles V. Sevelin, Maplewood, Minn.

[73] Assignee: Minnesota Mining and Manufacturing Company, Saint Paul, Minn.

[21] Appl. No.: 98,738

[22] Filed: Nov. 30, 1979

[51] Int. Cl.³ ............................................. G02B 5/128
[52] U.S. Cl. ..................................... 350/105; 350/97
[58] Field of Search ........... 350/105, 109, 103, 162 R, 350/129 R, 97, 102, 103; 40/135, 130, 208

[56] References Cited

U.S. PATENT DOCUMENTS

| | | | |
|---|---|---|---|
| 3,190,178 | 6/1965 | McKenzie | 350/105 |
| 3,712,706 | 1/1973 | Stamm | 350/103 |
| 3,801,183 | 4/1974 | Sevelin et al. | 350/105 |
| 3,877,786 | 4/1975 | Booras et al. | 350/105 |
| 3,994,086 | 11/1976 | Mizuochi | 350/105 |
| 4,085,314 | 4/1978 | Schultz et al. | 235/487 |

FOREIGN PATENT DOCUMENTS 2632667 7/1976 Fed. Rep. of Germany ...... 350/105
1202330 8/1970 United Kingdom ................ 350/105

*Primary Examiner*—John K. Corbin
*Assistant Examiner*—B. W. de los Reyes
*Attorney, Agent, or Firm*—Cruzan Alexander; Donald M. Sell; Roger R. Tamte

[57] ABSTRACT

Sheet assembly useful to form graphically imaged retroreflective markings comprises a base retroreflective sheeting and a film overlying the sheeting. The film is visibly distinctive from the base retroreflective sheeting and is held to the sheeting by a layer of pressure-sensitive adhesive. A heat-susceptible low-adhesion layer is interposed between the layer of adhesive and either the sheeting or overlying film. In use of the assembly, graphic symbols are cut in the film, and the background areas of the film manually peeled away. The assembly is then heated, whereupon a firm bond develops at the interface between the non-removed image portions of the film and the base retroreflective sheeting.

3 Claims, 1 Drawing Figure

U.S. Patent May 19, 1981 4,268,117
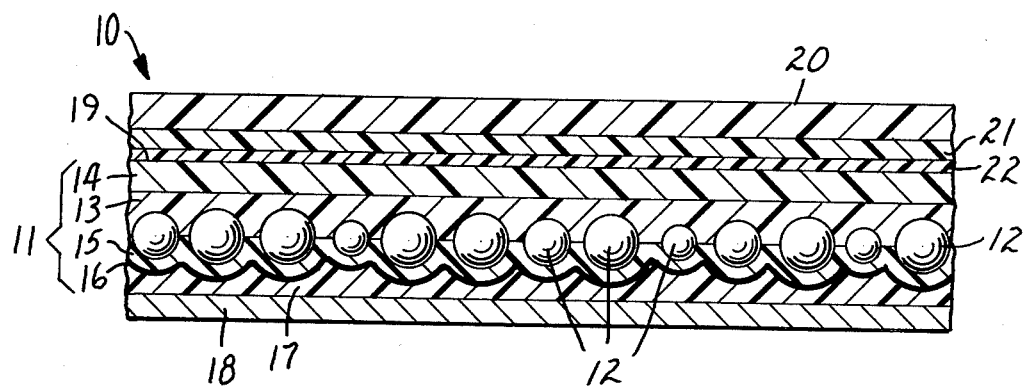

SHEET ASSEMBLY FOR FORMING IMAGED RETROREFLECTIVE SHEETING

Rather elaborate equipment is conventionally used to form images on retroreflective sheeting. For example, license plates are often formed by laminating retroreflective sheeting to a metal plate, embossing the plate to raise alphanumeric characters on the plate, and then roller-printing the raised characters to make them visibly distinctive from the reflective background. Other imaged reflective markings such as traffic-control signs are conventionally prepared by silkscreen printing techniques, which require equipment and materials for preparing the imaged screen as well as for printing with the screen.

For some uses of retroreflective sheeting, a more simple imaging technique is needed, as when the images are to be applied not by one large central agency but by many smaller individual agencies. For example, in some jurisdictions it is desired to issue and image license plates at local agencies, which cannot economically justify the cost of owning conventional embossing and printing equipment.

The present invention provides a sheet assembly from which graphically imaged retroreflective markings may be rapidly and conveniently made with little equipment. Briefly, this new sheet assembly comprises a base retroreflective sheeting that retroreflects light shined at the front surface of the sheeting; a film that overlies the front surface of the base retroreflective sheeting and is visibly distinctive from that surface; a layer of pressure-sensitive adhesive disposed between the film and base retroreflective sheeting; and a heat-susceptible low-adhesion layer interposed between the layer of pressure-sensitive adhesive and either the film or base retroreflective sheeting. The heat-susceptible layer has low adhesion to the pressure-sensitive adhesive layer prior to heat-exposure such that the assembly can be manually peeled apart at the interface between the low-adhesion and pressure-sensitive adhesive layers. But upon heating of the assembly to an elevated temperature, the low-adhesion layer and pressure-sensitive adhesive layer develop a firm and long-lasting bond between the film and base retroreflective sheeting. After cooling of the assembly to room temperature, the film generally cannot be manually peeled intact from the assembly.

The sheet assembly may be supplied with the overlying film cut along lines that define graphic symbols, or such lines may be cut into the film whenever it is desired to prepare imaged retroreflective markings. To form an image, the portions of the overlying film adjacent to the image portions are peeled away from the base retroreflective sheeting, and the sheet assembly is placed in an oven or passed through a heating apparatus so as to remove the low-adhesion character of the heat-susceptible layer and form a strong bond between the base retroreflective sheeting and imaging portions of the film.

The drawing is an enlarged sectional view through a sheet assembly of the invention 10, which comprises a base retroreflective sheeting 11 comprising, in this embodiment, a layer of glass microspheres 12, a transparent binder layer 13, a transparent top layer 14, a transparent spacing layer 15 having a contoured back surface appropriately spaced from the microspheres, a layer 16 of specularly reflecting material such as vapor-deposited aluminum coated on the contoured back surface of the layer 15, a layer 17 of adhesive, and a liner 18 which covers the layer of adhesive. The base retroreflective sheeting retroreflects light shined at the front surface 19 of the sheeting.

A film 20 that is visibly distinctive from the front surface of the base retroreflective sheeting overlies that surface, and a pressure-sensitive adhesive layer 21 and heat-susceptible layer 22 are interposed between the base retroreflective sheeting and the overlying film. As is well known, pressure-sensitive adhesives develop adhesion to a substrate at ambient temperature using moderate pressure such as thumb pressure, and a variety of materials are available for that purpose. The layer 22 has low adhesion to the pressure-sensitive adhesive layer 21, although there is sufficient adhesion for the film 20 to be held to the base retroreflective sheeting under normal handling conditions. The assembly will remain intact until a peeling force is applied to peel the film 20 away from the base retroreflective sheeting 11, with separation taking place at the interface between the layer of adhesive 21 and low-adhesion layer 22.

Various other kinds of retroreflective sheeting could be used instead of that shown, including sheeting such as described in McKenzie, U.S. Pat. No. 3,190,178, which is another form of microsphere-containing sheeting, and sheeting such as described in Stamm, U.S. Pat. No. 3,712,706, which uses cube-corner retroreflective elements instead of microspheres; the cube corners can be cast or embossed in the back surface of a transparent film.

Many materials are known that may be coated on a substrate to provide a surface having low adhesion toward a pressure-sensitive adhesive. For example, such materials have been used for many years as "low-adhesion backsizes" on backings for pressure-sensitive adhesive tapes to prevent the backings from adhering to overlying layers of tape when the tape is wound in a roll. Generally, sheet material treated with a low-adhesion backsize has an adhesion of less than about 10 ounces/inch width to the adhesive layer which it is intended to contact. In any event the adhesion is sufficiently low in products of the invention so that the base retroreflective sheeting and overlying film may be manually peeled apart.

We have now found that when an assembly of two sheets, which carry, respectively, a pressure-sensitive adhesive layer and a low-adhesion layer disposed in contact with one another, is heated above the softening point of the low-adhesion layer and then cooled, a strong bond develops between the sheets. In fact, in preferred embodiments of the invention the bond that develops is of greater strength than would have developed during heating in the absence of the low-adhesion layer.

The film adhered over the base retroreflective sheeting can be opaque or transparent, but should be visibly distinctive from the base retroreflective sheeting. The most common visible distinction between the overlying film and the base retroreflective sheeting is a difference in color. Quite often the base retroreflective sheeting will be a white or silver color (arising from the generally metallic specularly reflective layer) and the overlying film will be a different color, often black or a color that carries a traffic-control meaning, such as red or yellow.

The visibly distinctive film is generally a polymer-based film, comprising a polymer such as a polyester, polyvinyl chloride, or polyurethane. The thickness of the film can vary over a range of at least 10 to 200 micrometers. Generally, the film is quite flexible, for example, being rollable around a one-centimeter-diameter mandrel, so that it can be readily peeled from the base retroreflective sheeting.

Many techniques are available for cutting through the film without penetrating into the underlying base retroreflective sheeting. Such techniques include die cutting and cutting by hand with a razor blade.

Either before or after imaging, the sheet assembly of the invention is typically adhered to a substrate, using adhesive carried on the assembly or coated onto the assembly or substrate at the time of application. Alternatively, the sheet assembly may serve as a marking by itself.

The invention will be further illustrated with the following examples (parts are by weight).

EXAMPLE 1

A base retroreflective sheeting of the type shown in the drawing was coated on the front surface with a solution of a polyurethane made from polyvinyl alcohol and octadecylisocyanate. The coating was applied with a squeeze-roll coater and dried in an oven, leaving a dry low-adhesion layer about 0.25 micrometer thick. The coated sheeting was then passed through laminating rollers with a 50-micrometer-thick black polyvinylchloride-based film which carried a 25-micrometer-thick layer of pressure-sensitive adhesive that comprised 90 parts of 2-methyl butyl acrylate and 10 parts of acrylic acid, with the low-adhesion layer disposed against the adhesive layer. The sheeting and film remained adhered to one another even when the assembly was rolled in a tight roll (for example, around a one-centimeter-diameter mandrel) or flexed; but the film could be readily peeled away by lifting one corner of the film and pulling on the corner.

A section of the resulting sheet assembly was adhered to a metal plate and graphic symbols were cut in the overlying film using a razor blade. The background portions of the film were peeled away leaving the symbols in place on the base retroreflective sheeting. The whole composite was then placed for two minutes in an oven heated to 300° F. (150° C.). Upon removal from the oven the symbols could not be removed from the base retroreflective sheeting by scraping with a fingernail or by attempting to penetrate the interface between the sheeting and film with a spatula.

EXAMPLES 2 AND 3

Example 1 was repeated except that the low-adhesion layer was formed in Example 2 from a solution of a polymer comprising 60 parts of octadecylacrylate and 40 parts of acrylic acid and in Example 3 from a solution of a tetrapolymer comprising 51 parts octadecylacrylate, 29 parts of acrylonitrile, 11 parts of methylacrylate and 9 parts of acrylic acid. Again, the film was readily removed from the base retroreflective sheeting prior to heating of the sheet assembly, but graphic symbols cut from the overlying film became strongly adhered when the sheet assembly was heated in an oven.

What we claim is:

1. Sheet assembly useful to form graphically imaged retroreflective markings comprising a base retroreflective sheeting that retroreflects light shined against its front surface, a film overlying and visibly distinctive from the front surface of the base retroreflective sheeting, a layer of pressure-sensitive adhesive disposed between the film and base retroreflective sheeting, and a heat-susceptible low-adhesion layer interposed between the layer of pressure-sensitive adhesive and either the film or base retroreflective sheeting, the low adhesion layer having low adhesion to the pressure-sensitive adhesive layer prior to heat-exposure of the assembly such that the assembly may be manually peeled apart at the interface between the low-adhesion layer and pressure-sensitive adhesive layer, but developing in combination with the pressure-sensitive adhesive layer a firm and long-lasting bond between the film and base retroreflective sheeting when the assembly is heated to an elevated temperature.

2. Sheeting of claim 1 in which said overlying film has been cut along lines that define graphic symbols.

3. Sheeting of claim 1 in which said overlying film is visibly opaque.

* * * * *